US008046122B1

(12) United States Patent
Barta et al.

(10) Patent No.: US 8,046,122 B1
(45) Date of Patent: Oct. 25, 2011

(54) CONTROL SYSTEM FOR A MARINE VESSEL HYDRAULIC STEERING CYLINDER

(75) Inventors: Jason C. Barta, Menasha, WI (US); Gregory C. Folsom, Menasha, WI (US)

(73) Assignee: Brunswick Corporation, Lake Forest, IL (US)

( * ) Notice: Subject to any disclaimer, the term of this patent is extended or adjusted under 35 U.S.C. 154(b) by 525 days.

(21) Appl. No.: 12/185,176

(22) Filed: Aug. 4, 2008

(51) Int. Cl.
*F16D 31/02* (2006.01)
*G06F 19/00* (2006.01)

(52) U.S. Cl. ................................ 701/21; 701/41; 60/382

(58) Field of Classification Search .................... 701/21, 701/1, 41; 60/384
See application file for complete search history.

(56) References Cited

U.S. PATENT DOCUMENTS

| | | | | |
|---|---|---|---|---|
| 3,654,889 | A | 4/1972 | Bergstedt | |
| 3,680,583 | A | 8/1972 | Clair | |
| 4,006,664 | A | 2/1977 | Brown | |
| 4,016,949 | A | 4/1977 | Plate et al. | |
| 4,365,645 | A | 12/1982 | Wohlrab | |
| 4,449,470 | A * | 5/1984 | Rump | 114/150 |
| 4,458,775 | A | 7/1984 | Lestradet | |
| 4,659,315 | A | 4/1987 | Bland et al. | |
| 4,710,141 | A | 12/1987 | Ferguson | |
| 4,789,036 | A | 12/1988 | Haas | |
| 4,919,064 | A | 4/1990 | Ehluss et al. | |
| 5,092,801 | A | 3/1992 | McBeth | |
| 5,207,245 | A | 5/1993 | Maranzano | |
| 5,228,405 | A | 7/1993 | Merten | |
| 5,233,861 | A | 8/1993 | Gore et al. | |
| 5,266,060 | A | 11/1993 | Onoue | |
| 5,289,841 | A | 3/1994 | Maranzano | |
| 5,303,793 | A | 4/1994 | Kato et al. | |
| 5,387,142 | A | 2/1995 | Takayanagi et al. | |
| 5,427,045 | A | 6/1995 | Fetchko | |
| 5,449,186 | A | 9/1995 | Gerl et al. | |
| 5,454,291 | A | 10/1995 | Ulm et al. | |
| 5,503,098 | A | 4/1996 | Bohlin | |
| 5,505,275 | A | 4/1996 | Phillips | |
| 5,542,286 | A | 8/1996 | Wang et al. | |
| 5,605,109 | A | 2/1997 | Merten et al. | |
| 5,802,848 | A | 9/1998 | McClendon et al. | |
| 5,896,943 | A | 4/1999 | Christensen | |
| 6,055,809 | A * | 5/2000 | Kishi et al. | 60/475 |
| 6,067,782 | A | 5/2000 | Diekhans | |
| 6,138,596 | A | 10/2000 | Gonring et al. | |
| 6,269,903 | B1 | 8/2001 | Bohner et al. | |
| 6,378,302 | B1 | 4/2002 | Nozawa et al. | |
| 6,612,335 | B1 | 9/2003 | Assa et al. | |
| 6,715,438 | B1 * | 4/2004 | Hundertmark | 114/144 R |
| 6,755,703 | B1 * | 6/2004 | Erickson | 440/75 |
| 6,821,168 | B1 * | 11/2004 | Fisher et al. | 440/61 R |
| 6,896,092 | B2 | 5/2005 | Stall | |
| 6,955,114 | B2 | 10/2005 | Stockner et al. | |
| 7,037,152 | B2 | 5/2006 | Sasayama et al. | |

(Continued)

*Primary Examiner* — Tan Q Nguyen
(74) *Attorney, Agent, or Firm* — William D. Lanyi

(57) ABSTRACT

A control system for a hydraulic steering cylinder utilizes a supply valve and a drain valve. The supply valve is configured to supply pressurized hydraulic fluid from a pump to either of two cavities defined by the position of a piston within the hydraulic cylinder. A drain valve is configured to control the flow of hydraulic fluid away from the cavities within the hydraulic cylinder. The supply valve and the drain valve are both proportional valves in a preferred embodiment of the present invention in order to allow accurate and controlled movement of a steering device in response to movement of a steering wheel of a marine vessel.

20 Claims, 3 Drawing Sheets

U.S. PATENT DOCUMENTS 7,156,708 B2 1/2007 Dudra
7,160,163 B2 1/2007 Gai
2003/0033969 A1* 2/2003 Doetsch ........................ 114/150
2003/0150367 A1* 8/2003 Hundertmark ................ 114/150
2007/0028606 A1* 2/2007 Misunou et al. ................ 60/384

* cited by examiner

CONTROL SYSTEM FOR A MARINE VESSEL HYDRAULIC STEERING CYLINDER

CROSS REFERENCE TO RELATED APPLICATIONS

The present application is related to patent application Ser. No. 12/185,190 which was filed on the same date as the present application.

BACKGROUND OF THE INVENTION

1. Field of the Invention

The present invention is generally related to a hydraulic steering cylinder control system and, more particularly, to a control system which uses two 3-way valves to control the rate of flow of hydraulic fluid to and from two sides of a piston and also selects the appropriate side of the piston that is supplied with pressurized oil and the side of the piston from which oil is drained in order to facilitate accurate and smooth movement of the piston within its hydraulic cylinder casing.

2. Description of the Related Art

Many types of hydraulic cylinder control systems are known to those skilled in the art. In addition, hydraulic cylinders used to actuate steering movements of vehicles are known to those skilled in the art. Some steering cylinders are used to control the movement of a marine vessel in response to changes in the position of a steering wheel which is manually movable. Many different types of hydraulic valves are known to those skilled in the art. Proportional valves have been used in various applications. Marine propulsion devices can be outboard motors, sterndrive systems, pod-type propulsion devices that extend downwardly through the bottom surface of a water craft hull, or inboard marine propulsion systems that are steered through the use of a rudder.

U.S. Pat. No. 3,654,889, which issued to Bergstedt on Apr. 11, 1972, describes a hydraulic system for a boat drive. The system for steering and tilting an outboard drive unit for a boat includes a pump, a steering subsystem including a double acting cylinder and piston connected to provide steering movement to a steerable part of the unit and provided with hydraulic liquid from the pump and a trimming and tilting subsystem including a cylinder and piston assembly provided with liquid from the steering subsystem.

U.S. Pat. No. 3,680,583, which issued to Clair on Aug. 1, 1972, describes an automatic sequential operated valve. An automatic four-way valve hydraulically operated for extending and retracting a refuse compaction cylinder is described. It senses a pressure build-up as the trash is compacted and releases a pressure responsive detent allowing a spring to drive the valve spool of the primary valve to a return position. It allows the cylinder to retract until it reaches the end of its stroke whereupon a pressure build-up causes a pilot cylinder to move the valve spool to the neutral open center position.

U.S. Pat. No. 4,006,664, which issued to Brown on Feb. 8, 1977, describes a steering system including tandem hydraulic cylinders with self-synchronization. It is suitable when front and wheel rears are hydraulically steered, each set by its own hydraulic cylinder. The two cylinders are connected in hydraulic tandem so that the same angularity of steering will be imparted to both sets of wheels.

U.S. Pat. No. 4,016,949, which issued to Plate et al. on Apr. 12, 1977, describes a hydrostatic load sensitive regenerative steering system. A control valve operated by the steering wheel to selectively connect a variable displacement pump for operating a hydraulic cylinder in each of two directions to steer the wheel is described. The hydrostatic system is regenerative in steering of the hydraulic cylinder in one direction since both sides of the hydraulic cylinder are connected to the high pressure input line in steering in one direction.

U.S. Pat. No. 4,365,645, which issued to Wohlrab on Dec. 28, 1982, describes a three-way flow regulating valve. It comprises a two-position two-ported throttle valve inserted between an inflow conduit and an outflow conduit and a pressure relief valve connected to the inflow conduit at an upstream point thereof and at a downstream point proximate to an intake port of the throttle valve. A servo valve is connected in parallel to the throttle valve via small diameter pressure transmission channels extending to the intake port and to the output port of the throttle valve. Upon a jump in the pressurization of the inflow conduit, for example due to the activation of an auxiliary pump, the pressure relief valve opens. It closes again only upon an equalization of the pressure throughout the inflow conduit.

U.S. Pat. No. 4,449,470, which issued to Rump on May 22, 1984, describes a hydraulic control package for a marine steering system. It has a steering helm pump with port and starboard fluid outlets and a return inlet for hydraulically actuating a piston in a hydraulic cylinder having port and starboard inlets for moving the piston back and forth in the cylinder in response to fluid delivered from the helm pump. A fluid reservoir is closed and pressurized with air and is defined by an open ended tube having a cap sealing the top end of the tube and a valve body sealing the bottom end of the tube. The valve body houses the control valve means for controlling the fluid flow in the system between the helm pump and the actuating cylinder.

U.S. Pat. No. 4,458,775, which issued to Lestradet on Jul. 10, 1984, describes an apparatus for guiding a vehicle. It comprises a detector sensing deviation of the heading of the vehicle relative to a predetermined direction and it produces an electrical deviation signal. It also comprises a hydraulic piston and cylinder device for steering the vehicle wheels and control means responsive to the deviation signal.

U.S. Pat. No. 4,659,315, which issued to Bland et al. on Apr. 21, 1987, describes a hydraulic system for marine propulsion devices. It comprises a gimbal housing adapted to be fixedly attached to the transom of a boat and including an end plate adapted to be generally aligned with the boat transom and having an opening, opposite sides, and a rear surface. The gimbal housing also includes a first generally vertical side member extending rearwardly from one side of the end plate and a second generally vertical side member extending rearwardly from the other side of the end plate. A gimbal ring is pivotally connected to the gimbal housing for pivotal movement relative to the gimbal housing about a generally vertical steering axis.

U.S. Pat. No. 4,710,141, which issued to Ferguson on Dec. 1, 1987, describes a marine propulsion device power steering system. It includes a propulsion unit mounted for tilting movement about a generally horizontal tilt axis and for pivotal steering movement about a vertical steering axis. It also comprises a power steering system adapted to operably connect an actuator to the propulsion for increasing the steering force applied to the propulsion unit by the actuator.

U.S. Pat. No. 4,789,036, which issued to Haas on Dec. 6, 1988, describes a hydraulic steering device. It is intended for changing the speed and direction of a hydraulically operated track vehicle. The hydraulic control system is equipped with a feed pump for the control fluid and with hydraulic undercarriage pumps. The undercarriage pumps comprise regulating cylinders and are subjected to the control fluid and intended for adjusting the pump pivoting angle.

U.S. Pat. No. 4,919,064, which issued to Ehluss et al. on Apr. 24, 1990, describes a hydraulic system for shift rudder roll stabilization and steering. It comprises a constant delivery pump, a pressure accumulator, and a valve gear unit. While the valve is opened the hydraulic fluid is delivered by the pump in the accumulator and when the valve is closed the pump fills up the accumulator to maximum working pressure. The valve gear unit comprises a proportional control valve for controlling period, direction and flow rate of the hydraulic fluid to the steering engine and a load compensation device for controlling the returning flow returning via the proportional control valve for compensating for irregular loads from the waves or the sea against the rudder.

U.S. Pat. No. 5,092,801, which issued to McBeth on Mar. 3, 1992, describes a hydraulic steering assembly for outboard marine engines. The assembly is connected to the tiller arm of an outboard marine engine and includes a piston rod supporting for arcuate movement about the tilt axis while remaining parallel thereto. A hydraulic cylinder travels along the piston rod. An arm extends from the cylinder to a first pivotal member establishing a first pivotal connection about an axis parallel to the tilt axis. A rigid link extends between the first pivotal member and a second pivotal member.

U.S. Pat. No. 5,207,245, which issued to Maranzano on May 4, 1993, describes a solenoid valve and a valve calibrating method. The valve has a paramagnetic valve body and a ferromagnetic adjustable end stop connected by a ferromagnetic tubular sleeve and forming a housing defining a valve chamber containing an axially elongate generally cylindrical ferromagnetic solenoid plunger supported for axial reciprocal movement between a pair of axially opposed valve seats.

U.S. Pat. No. 5,228,405, which issued to Merten on Jul. 20, 1993, describes a power steering system. It has a propulsion unit, including a steering arm, to effect steering movement thereof about a steering axis and an operator actuable steering helm. A first actuable steering member, such as a mechanical push-pull cable is operably connected to the steering helm and actuated in response to steering actuation at the helm.

U.S. Pat. No. 5,233,861, which issued to Gore et al. Aug. 10, 1993, describes an apparatus and method for in situ calibration of a metering device. A calibrated gas source and inlet are provided. Connected to the calibrated gas source is a first three-way valve. The first three-way valve is connected to an inlet of the metering device with an outlet connected to a second three-way valve. The second three-way valve is connected to both a reaction chamber or an exhaust. A calibration gas is allowed to flow through the calibration inlet, through the first three-way valve, through the metering device, and through the second three-way valve so as to calibrate the metering device to the calibrated gas source.

U.S. Pat. No. 5,266,060, which issued to Onoue on Nov. 30, 1993, describes a steering device for a marine propulsion device. It provides an improved apparatus for controlling the steering of a watercraft. Specifically, the steering device includes a push-pull cable steering arrangement which has a portion located along the rear of the watercraft. Such rearward portion is disposed for reciprocal movement within a cylindrical cable guide. The steering device also includes a hydraulic power assist arrangement which includes a hydraulic cylinder having a movable piston and associated piston rod contained therein.

U.S. Pat. No. 5,289,841, which issued to Maranzano on Mar. 1, 1994, describes a solenoid valve and valve calibrating method. A plunger is biased toward seating engagement with an associated one of the seats and is movable out of seating engagement with the one seat and into seating engagement with the other seat in response to energization of a surrounding solenoid coil. An annular ferromagnetic flux ring disposed adjacent one end of the coil cooperates with a diametrically enlarged portion of the plunger to define a portion of a flux path. The position of the end stop relative to the sleeve is adjusted during manufacture to set the clearance between the valve plunger and the one valve seat thereby enabling accurate valve calibration.

U.S. Pat. No. 5,303,793, which issued to Kato et al. on Apr. 19, 1994, describes a steering apparatus of rack-and-pinion type that comprises an input shaft steered by a driver, an output shaft operatively connected to a rack bar through a rack and pinion gear mechanism, a hydraulic cylinder operatively connected to the rack bar, and a rotary valve operatively connected to the input shaft.

U.S. Pat. No. 5,387,142, which issued to Takayanagi et al. on Feb. 7, 1995, describes a power steering device for an outboard engine. It has a hydraulic cylinder unit for angularly moving a steering arm of the outboard engine, the hydraulic cylinder unit having a piston rod connected to the steering arm, and a directional control spool valve for supplying a hydraulic pressure to the hydraulic cylinder unit to move the piston rod.

U.S. Pat. No. 5,427,045, which issued to Fetchko on Jun. 27, 1995, describes a steering cylinder with integral servo and valve. The steering apparatus for a marine craft includes an actuator assembly including a hydraulic steering actuator. The steering actuator is operatively connected to the tiller of the craft. A hydraulic servo actuator is mounted on the steering actuator. The servo actuator is permitted limited axial displacement relative to the steering actuator. The servo actuator is operatively connected to the steering actuator. The servo valve is mounted on the actuator assembly and has ports for receiving pressurized hydraulic fluid.

U.S. Pat. No. 5,449,186, which issued to Gerl et al. on Sep. 12, 1995, describes a rear wheel steering system. An actuating system includes a differential hydraulic cylinder containing a piston and a piston rod connected to one side of the piston. A first or head chamber is defined in the cylinder and is bounded by the one side of the piston to which the piston rod is not connected. A second or rod chamber is also defined in the cylinder and is bounded by the other side of the piston to which the piston rod is connected. An actuatable assembly is provided that is adapted to be connected to either the hydraulic cylinder or the piston rod. Finally, a proportional control valve is provided which is adapted to actuate the hydraulic cylinder by controlling the amount of fluid supply to the first chamber wherein the supply pressure is connected to the second chamber.

U.S. Pat. No. 5,454,291, which issued to Ulm et al. on Oct. 3, 1995, describes an electrohydraulic regulating device having pulse width modulated valves with an adjusting signal. An electrically actuating control valve controls the hydraulic fluid flow to the adjusting cylinder. At least one electrically actuated switching valve blocks or admits a hydraulic fluid flow. A control unit generates control signals for the control valve and the switching valve. The regulating circuit supplies a pulse width modulated regulating signal for regulating a mean current of the control valve.

U.S. Pat. No. 5,503,098, which issued to Bohlin on Apr. 2, 1996, describes an air purging device for hydraulic boat steering arrangements. It contains a hydraulic pump actuated by a boat steering wheel and has first and second fluid inlet/outlet ports, a hydraulic piston cylinder device with first and second chambers on either side of the piston and first and second hydraulic circuits between the inlet/outlet ports of the pump and corresponding inlet/outlet ports to the respective chambers. A valve unit can be coupled into the respective connection between the inlet/outlet port of the respective chamber and the inlet/outlet port of the pump, via which valve unit air in the fluid can be released.

U.S. Pat. No. 5,505,275, which issued to Phillips on Apr. 9, 1996, describes a power steering system for a motor vehicle having a power cylinder with the piston mounted in the power cylinder which divides the power cylinder into first and second chambers. The steering system includes a valve assembly having a rotary input member and a valve sleeve and first and second pairs of open center input valves, each having an inlet and an outlet. The inlets of the input valves are fluidly connected to the pump output. The valve assembly further includes a pair of closed center input valves and a normally closed bypass valve.

U.S. Pat. No. 5,542,286, which issued to Wang et al. on Aug. 6, 1996, describes a method and apparatus for correcting flow and pressure sensor drift in a gas chromatograph. At a convenient time when the chromatograph is not being used for analysis, the input valves controlling the input into the chromatograph are shut, reducing internal flow to zero. The indicated rate of flow is then measured using the flow sensor. If the value measured by the flow sensor during the test is different than the originally calibrated offset by some predetermined amount, then the newly measured value replaces the stored offset value.

U.S. Pat. No. 5,605,109, which issued to Merten et al. on Feb. 25, 1997, describes a power steering system. It includes a hydraulic fluid cylinder-piston assembly and is actuated in response to steering actuation at the steering helm. It has controls for maintaining anti-feed back upon a failure in the fluid source including a valve to establish fluid communication between a fluid source for the cylinder-piston assembly and the chamber in the assembly to either side of the piston thereby maintaining the chamber substantially full of hydraulic fluid during steering to effect movement of the piston upon steering actuation.

U.S. Pat. No. 5,802,848, which issued to McClendon et al. on Sep. 8, 1998, describes a hydraulic system for a motor vehicle. It includes a power steering pump, a reservoir, a steering assist fluid motor, and a second fluid motor for a radiator cooling fan. A flow control valve remote from the power steering pump divides the total fluid flow from the power steering pump into a high flow branch and a low flow branch.

U.S. Pat. No. 5,896,943, which issued to Christensen on Apr. 27, 1999, describes a hydraulic control system for work vehicles. The system includes a control unit to control the steering wheels of a vehicle via a cylinder and a priority valve which by a first load-sensing system controls the pressure fluid flow to the control unit and to a subsequent proportional valve group. By a second load sensing system the proportional valve group controls the pressure fluid flow to secondary hydraulic motors or work cylinders to control the work tools of the vehicle.

U.S. Pat. No. 6,067,782, which issued to Diekhans on May 30, 2000, describes an electrohydraulic steering system. The system includes manual steering and automatic steering modes which can be activated by a switch. The system has a hydraulic steering cylinder for displacement of the steering wheels, at least one sensor for determining the wheel angle actual values, at least one electrically operated hydraulic control valve which regulates admission of hydraulic fluid to the steering cylinder and at least one automatic steering signal transmitter for generating electrical steering signal nominal values of the wheel angles.

U.S. Pat. No. 6,138,596, which issued to Gonring et al. on Oct. 31, 2000, discloses a damped steering mechanism for a watercraft. A hydraulic damper is provided for a steering system such as that of a boat or watercraft. A manually movable steering mechanism, such as the steering wheel, is connected to a piston and cylinder combination in such a way that rotation of the steering wheel causes relative movement between the piston and cylinder. Hydraulic fluid is disposed within the cylinder in such a way that movement between the cylinder and piston requires the hydraulic fluid to move from one portion of the cylinder to another portion of the cylinder. This fluid movement is conducted through a conduit which can be external to the cylinder or internal to the cylinder and extending through the piston.

U.S. Pat. No. 6,269,903, which issued to Bohner et al. on Apr. 7, 2001, describes a steering system for a vehicle. High functional reliability for a vehicle steering system that can be switched between a normal mode with a steer-by-wire level and an emergency mode with a fall back level is achieved by providing that the fall back level has a hydraulic system which contains a manual-side double-acting piston-cylinder unit which is actuated with a steering handle. The unit is positively coupled hydraulically to a wheel-side double-acting piston-cylinder unit which actuates steered vehicle wheels.

U.S. Pat. No. 6,378,302, which issued to Nozawa et al. on Apr. 30, 2002, describes a hydraulic circuit system. A hydraulic line slit formed in a valve body of a flow distribution valve, a control chamber, and a hydraulic line are connected to a signal transmitting hydraulic line. A lap portion is formed in the hydraulic line slit, the lap portion having a check valve function with a lap amount when the valve body is in a cut off position. A two-position, three-way valve is disposed in the hydraulic line. The valve connects the control chamber of the flow distribution valve to only the signal transmitting hydraulic line when an external signal is not applied and to both the signal transmitting hydraulic line and a lower-pressure detecting hydraulic line which is connected an outlet passage of a flow distribution valve on the side of a hydraulic actuator when the external signal is applied.

U.S. Pat. No. 6,612,335, which issued to Assa et al. on Sep. 2, 2003, describes a three-way control valve. It comprises a body formed with an inlet port for connecting to a pressurized supply line, a first outlet port for connecting to an outlet line and being in flow communication with the inlet port, a gate intermediate the inlet port and the first outlet port, dividing the body into an inlet chamber and an outlet chamber, the body further comprising a second outlet extending from the outlet chamber, and a control chamber fitted with a deformable diaphragm sealingly engagement with the gate so as to prevent flow between the inlet port and the first outlet port.

U.S. Pat. No. 6,821,168, which issued to Fisher et al. on Nov. 23, 2004, discloses a power steering system for a marine vessel. An outboard motor is provided with an internally contained cylinder and movable piston. The piston is caused to move by changes in differential pressure between first and second cavities within the cylinder. By adding a hydraulic pump and a steering valve, the hydraulic steering system described in U.S. Pat. No. 6,402,577 is converted to a power hydraulic steering system by adding a hydraulic pump and a steering valve to a manual hydraulic steering system.

U.S. Pat. No. 6,896,092, which issued to Stall on May 24, 2005, describes a hydraulic steering device. It has a steering angle transmitter in communication with a steering valve which, as a function of the actuation of the steering angle transmitter, controls the communication between the steering drive with a hydraulic pressure source and a reservoir and a correction device. The correction device provides a synchronization of the position of the steering angle transmitter with the position of the steering angle drive when the steering drive or steering angle transmitter is in a reference range and the position of the steering angle transmitter and/or of the steering drive varies from the reference range.

U.S. Pat. No. 6,955,114, which issued to Stockner et al. on Oct. 18, 2005, describes a three-way valve and electrohydraulic actuator using the same. It relates to high speed control valves which are especially applicable for use in fuel injection systems. Reducing a valve with a quick response time within acceptable packaging constraints and with a structure that allows the valve to be mass produced with consistent performance between valves is problematic. By moving flow restrictions within the valve away from the valve seats, flow forces on the valve member can be reduced while possibly also permitting a reduction in the necessary travel distance of the valve member to improve response time and other performance characteristics.

U.S. Pat. No. 7,037,152, which issued to Sasayama et al. on May 2, 2006, describes a steering apparatus for an outboard marine engine. A tilt tube extends along a horizontal tilt axis. A steering hydraulic cylinder slides along a piston rod which extends in parallel with the tilt axis. An eccentric link shaft is positioned between the tilt tube and the piston rod and extends in parallel with the tilt axis. A pair of linking means supports the tilt tube, link shaft and piston rod. The distance between the tilt tube and the piston rod is shorter than the sum of the distance between the tilt tube and the link shaft and the distance between the link shaft and the piston rod.

U.S. Pat. No. 7,156,708, which issued to Dudra on Jan. 2, 2007, describes a marine steering assembly with an integrated pivot pin. An assembly for applying a force to a tiller of a marine outboard propulsion unit is described. The steering assembly comprises a hydraulic steering actuator including a cylinder and an elongated piston rod. A pivot member is pivotally mounted on the tiller of the propulsion unit for pivoting about a first link axis which is parallel to the steering axis. There is a pair of actuator arms, each actuator arm being connected to the cylinder and having a portion extending radially outward with respect to the piston rod axis.

U.S. Pat. No. 7,160,163, which issued to Gai on Jan. 9, 2007, describes a steering device for use with marine outboard engines. The steering device has an end for fastening to transoms of watercrafts. The motor/propeller assembly is mounted to the end to rotate about a substantially vertical steering axis. A closed hydraulic circuit has at least one pump driven by the steering unit and at least one double-acting cylinder which is slidably on at least one coaxial rod. The rod sealingly projects out of the cylinder head and carries a separating piston which divides the cylinder into two variable volume chambers. At least one of the inlet/outlets of at least one of the two chambers is formed by the rod. The rod has an axial hole extending from its outer end to one or more ports for communication with corresponding chambers of the cylinder. The ports are arranged to be adjacent to the piston side turned toward the cylinder head from where the rod projects.

The patents described above are hereby expressly incorporated by reference in the description of the present invention.

As described above, many types of steering systems are known to those skilled in the art. Some of these steering systems are used on watercraft in order to move a propulsion device or rudder about a generally vertical steering axis. When a hydraulic cylinder and piston are used to actuate a steering device, there is an inherent problem that exists because of the presence of a single steering rod attached to one side of the piston. Because of this attachment, the surface area on the rod-bearing side of the piston is less than the surface area on the opposite side of the piston. If the flow of hydraulic fluid is generally constant, the resulting effect is that the piston will move in a retracting direction at a faster rate than in the actuating direction. If the hydraulic cylinder device has a piston rod extending from both sides of the piston, this problem does not exist. However, in hydraulic cylinder devices that have one piston rod attached to one side of the piston, the actuation of the piston in one direction will naturally be at a slower rate than the retraction of the piston in the other direction. This situation exacerbates the problem of maintaining very accurate positioning of a steering cylinder piston. It would therefore be significantly beneficial if a steering system could be provided in which the control of fluid flow to both sides of the piston is maintained in an accurate manner.

SUMMARY OF THE INVENTION

A hydraulic cylinder control system made in accordance with a preferred embodiment of the present invention comprises a piston disposed within the hydraulic cylinder to define a first cavity on a first side of the piston and a second cavity on a second side of the piston, a pump configured to provide a flow of pressurized hydraulic fluid, a first valve connected in fluid communication between the pump and the hydraulic cylinder, a second valve connected in fluid communication with the hydraulic cylinder. The first valve is configured to selectively conduct the hydraulic fluid to one of the first and second cavities which selected as a function of a first signal received by the first valve. The second valve is configured to selectively conduct the hydraulic fluid from one of the first and second cavities which is selected as a function of a second signal received by the second valve.

In a preferred embodiment of the present invention, it further comprises a microprocessor connected in signal communication with the first and second valves and configured to provide the first and second signals to control the flow of the hydraulic fluid to and from the hydraulic cylinder. A preferred embodiment of the present invention can further comprise a steering device which is manually movable to control the movement of the marine vessel. The microprocessor is connected in signal communication with the steering device to receive a steering signal. The microprocessor determines the first and second signals as a function of the steering signal. The steering device can comprise a steering wheel and a sensor which is configured to provide the steering signal which is representative of the magnitude of rotation of the steering wheel.

In a preferred embodiment of the present invention, the hydraulic cylinder is a steering cylinder of a marine vessel. The first and second valves can be proportional valves. The second valve is configured to selectively conduct the hydraulic fluid from one of the first and second cavities to a reservoir for recirculation to the pump. The piston, which is disposed within the hydraulic cylinder housing, has a first surface facing the first cavity and a second surface facing the second cavity. The first surface has a larger area than the second surface. The first valve can be configured to control the rate of flow of hydraulic fluid from the pump to the hydraulic cylinder and to determine to which of the first and second cavities the flow of hydraulic fluid is directed. The second valve can be configured to control the rate of flow of hydraulic fluid from the hydraulic cylinder and to determine from which of the first and second cavities the flow of hydraulic fluid is drained.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
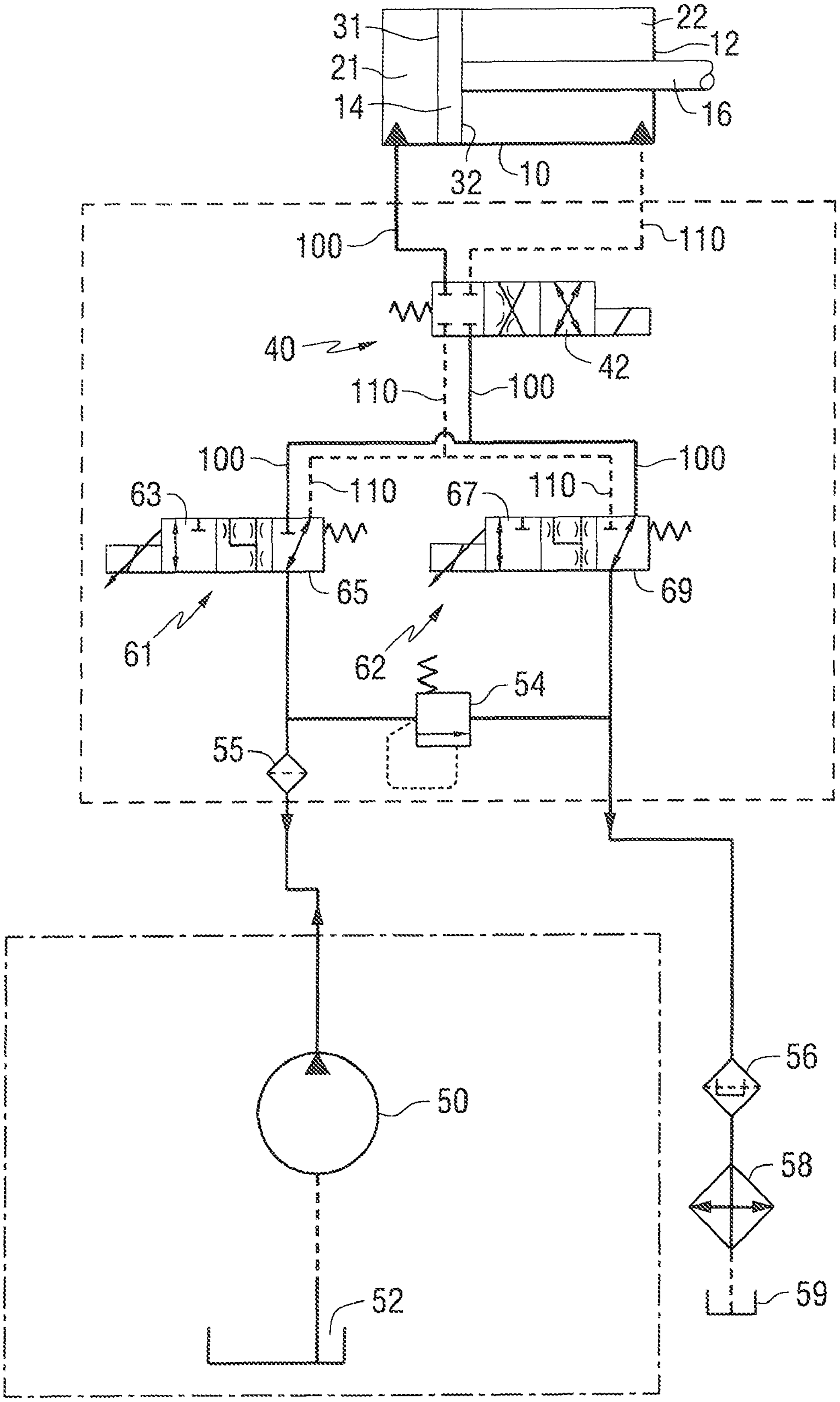
FIG. 1 is a schematic diagram of a hydraulic cylinder control system made in accordance with a preferred embodiment of the present invention.

Throughout the description of the preferred embodiment of the present invention, like components will be identified by like reference numerals.

FIG. 1 is a schematic diagram of a hydraulic cylinder control system made in accordance with a preferred embodiment of the present invention. A steering cylinder 10 comprises a cylindrical housing 12 that has a piston 14 disposed therein. The piston 14 defines a first cavity 21 on a first side of the piston and a second cavity 22 on a second side of the piston. The piston 14 has a first surface 31 and a second surface 32. Because of the attachment of a piston rod 16 to the second surface 32, the effective area on which hydraulic fluid in the second cavity 22 can act is less than the effective area of the first surface 31. When hydraulic fluid is conducted into the first cavity 21, the piston rod 16 is actuated by movement toward the right in FIG. 1. Conversely, when pressurized hydraulic fluid is introduced into the second cavity 22, the piston rod 16 is retracted by movement of the piston rod toward the left in FIG. 1. The relationship between steering cylinders and various vehicles, such as watercraft, that are steered through the actuation and retraction of the cylinder is described in detail in conjunction with the related patents identified above and will therefore not be described in detail herein. These arrangements of steering cylinders are also illustrated in various configurations in the above cited patents. The valve identified by reference numeral 40 in FIG. 1 is provided for lock out purposes and is not directly related to the operation of the present invention. In fact, the present invention's operation would be essentially unaffected if valve 40 was eliminated and not provided as part of the system shown in FIG. 1.

With continued reference to FIG. 1, a preferred embodiment of the present invention also comprises a pump 50 which is configured to provide a flow of pressurized hydraulic fluid from a reservoir 52. The pump, in one embodiment of the present invention, is an engine mounted variable displacement piston pump. Other components shown in FIG. 1 include a pressure relief valve 54, a screen 55, a media filter 56, an oil/water exchanger 58 and an auxiliary reservoir 59. Hydraulic fluid returned to the auxiliary reservoir 59 is eventually conducted to the reservoir 52 for recirculation by the pump 50. In alternative embodiments of the present invention, the reservoir 52 and the auxiliary reservoir 59 can be combined.

With continued reference to FIG. 1, a preferred embodiment of the present invention comprises a first valve, or supply valve 61, and a second valve, or a drain valve 62. The primary function of the supply valve 61 is to selectively provide pressurized hydraulic fluid, from the pump 50, to either the first cavity 21 or the second cavity 22. The drain valve 62, on the other hand, has a primary function of selectively directing the flow of hydraulic fluid from either the first or second cavities, 21 or 22, and regulating the rate of that flow. In a preferred embodiment of the present invention, the supply valve 61 and the drain valve 62 are both proportional 3-way valves.

Figure 2:
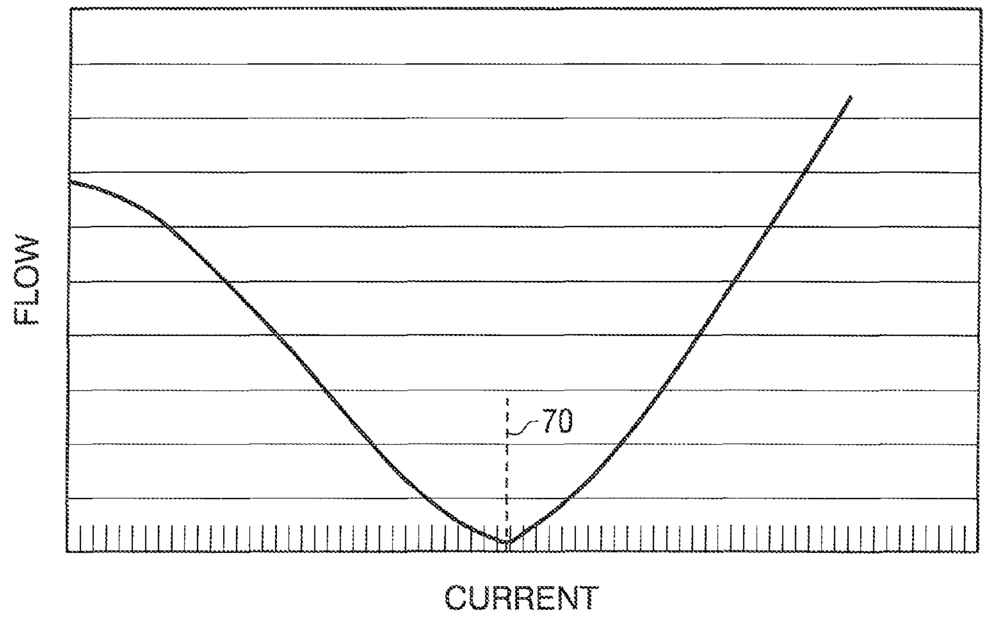
FIG. 2 is a graphical representation of the relationships between solenoid current and hydraulic fluid flow for both the supply valve and drain valve in a preferred embodiment of the present invention.

FIG. 2 is a graphical representation of the operating specification for the supply and drain valves. With continued reference to FIGS. 1 and 2, the supply valve 61 has an operating characteristic, according to a preferred embodiment of the present invention, where a current of approximately 660 milliamps provided to its solenoid coil will result in a minimum hydraulic flow through its structure. This point is identified by dashed line 70. Electrical currents greater than that represented by dashed line 70 result in the hydraulic fluid being directed, by the supply valve 61, to the first cavity 21 to cause the piston 14 to move toward the right and extend the piston rod 16 from the hydraulic cylinder 10. Conversely, electrical currents less than that indicated by dashed line 70 cause the hydraulic fluid to be directed to the second cavity 22. The difference in electrical current magnitude from that represented by dashed line 70, in an absolute sense, determined the rate of flow into the selected cavity.

With continued reference to FIGS. 1 and 2, when both valves, 61 and 62, are provided with minimum current, a movement of the piston 14 toward the left to achieve full retraction of the piston rod 16 results. Similarly, providing full current to the solenoids of both valves, 61 and 62, will result in the piston 14 moving toward the right to achieve full extension for actuation of the piston rod 16.

The schematic representation in FIG. 1 shows both the supply valve 61 and the drain valve 62 in their minimum current positions. It should be understood that the lockout valve 40 would normally be activated during operation of the present invention so that position 42 would be the operative position and would govern the flows of hydraulic fluid through the lockout valve 40. Because of the "crossover" nature of section 42 of the lockout valve 40, the conduits to the first and second cavities, 21 and 22, have been drawn to clarify the arrangement. Solid lines 100 are used to designate the path of hydraulic fluid to and from the first cavity 21. Dashed lines 110 are used to designate the path of hydraulic fluid to and from the second cavity 22. When in the positions shown in FIG. 1, the supply valve 61 and drain valve 62 will cause pressurized hydraulic fluid to flow from the pump 50, through section 65 of the supply valve 61, through dashed line 110, through section 42 of the lockout valve 40, and into the second cavity 22 to urge the piston 14 toward the left in FIG. 1. Hydraulic fluid within the first cavity 21 will be urged to flow through conduit 100, through section 42 of the lockout valve 40, through conduit 100 which is represented by a solid line between the lockout valve 40 and the drain valve 62, through section 69 of the drain valve 62, and downwardly in FIG. 1 through the media filter 56 and the arrow/water exchanger into the reservoir identified by reference numeral 59. If both the supply and drain valves, 61 and 62, are energized to their maximum capacity (represented by a shift to the right of both valves in FIG. 1), pressurized oil from the pump 50 would be directed through section 63 of the supply valve 61, through the conduit 100 to section 42 of the lockout valve 40, and into the first cavity 21 of the hydraulic cylinder 10. This will cause movement toward the right of the piston 14 and induce hydraulic fluid to flow out of the second cavity 22 through dashed line 110, section 42 of the lockout valve 40, through conduit 110, through section 69 of the drain valve 62, and downwardly through the media filter 56 to the reservoir 59. It should be realized that, since the supply valve 61 and drain valve 62 are proportional valves, numerous intermediate positions between the minimum and maximum currents to their respective solenoids are possible. These variations in current allow the two valves to achieve the numerous flow rates described in FIG. 2.

Figure 3:
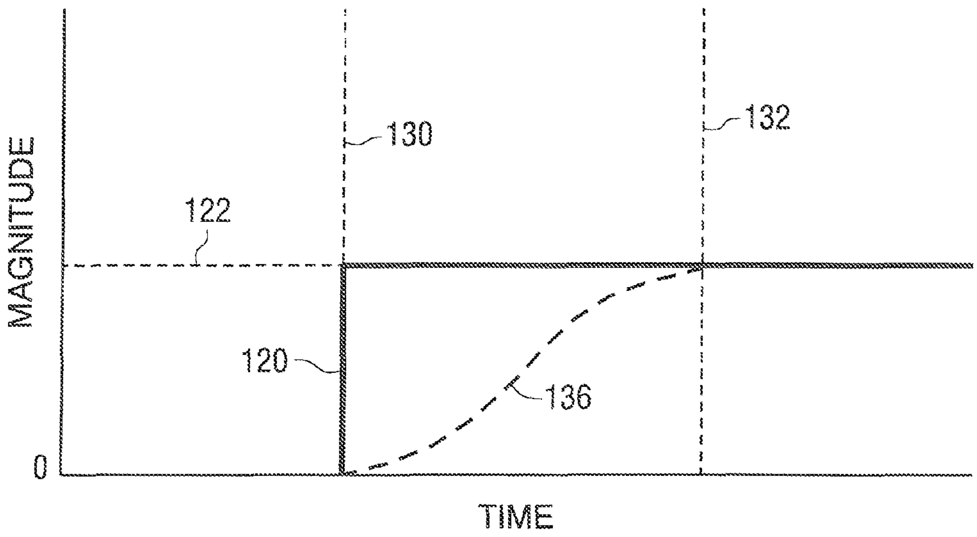
FIG. 3 is a graphical representation of the relationship between changes in magnitude of a steering device and the flow rate of hydraulic fluid into and out of a hydraulic steering cylinder.

FIG. 3 is a graphical representation of the changes in magnitude of both a steering mechanism, such as a sensor signal associated with a steering wheel of a marine vessel, and the flow rates of hydraulic fluid flowing into and out of the cavities of a hydraulic cylinder as described above. The solid line 120 in FIG. 3 represents a rapid change in status of a signal from a steering sensor which indicates a sudden movement of a steering wheel from a first position to a second position. In this illustration, a zero magnitude represents a prior stable position of a steering wheel and the magnitude represented by dashed line 122 illustrates a new position of the steering wheel. From the time that this change occurs, as represented by dashed line 130, to a later time represented by dashed line 132 when movement of a marine propulsion device or rudder is completed to achieve the desired change in steering angle, dashed line 136 represents the change in flow into and out of the various cavities of the hydraulic cylinder. It can be seen that, beginning at time 130, the fluid flow accelerates from a no flow condition in a controlled manner to achieve a controlled acceleration of the piston rod from its previous stationary position toward its new commanded position. As the piston approaches its destination, the rate of fluid flow into the hydraulic cylinder is decelerated as it approaches time 132. The curve of dashed line 136 can be described in terms of a controlled acceleration followed by some velocity and then terminated at some prescribed deceleration. These parameters can be defined for any particular system so that the movement from time 130 to time 132 achieves the desired magnitude defined by dashed line 122. This acceleration, maximum velocity, and deceleration are controlled by the supply and drain valves, 61 and 62, as described above. Since they are proportional valves, the electrical currents provided to their respective solenoids can be selected and changed to achieve the acceleration of dashed line 136 according to the basic principles described above in conjunction with FIG. 2.

Figure 4:
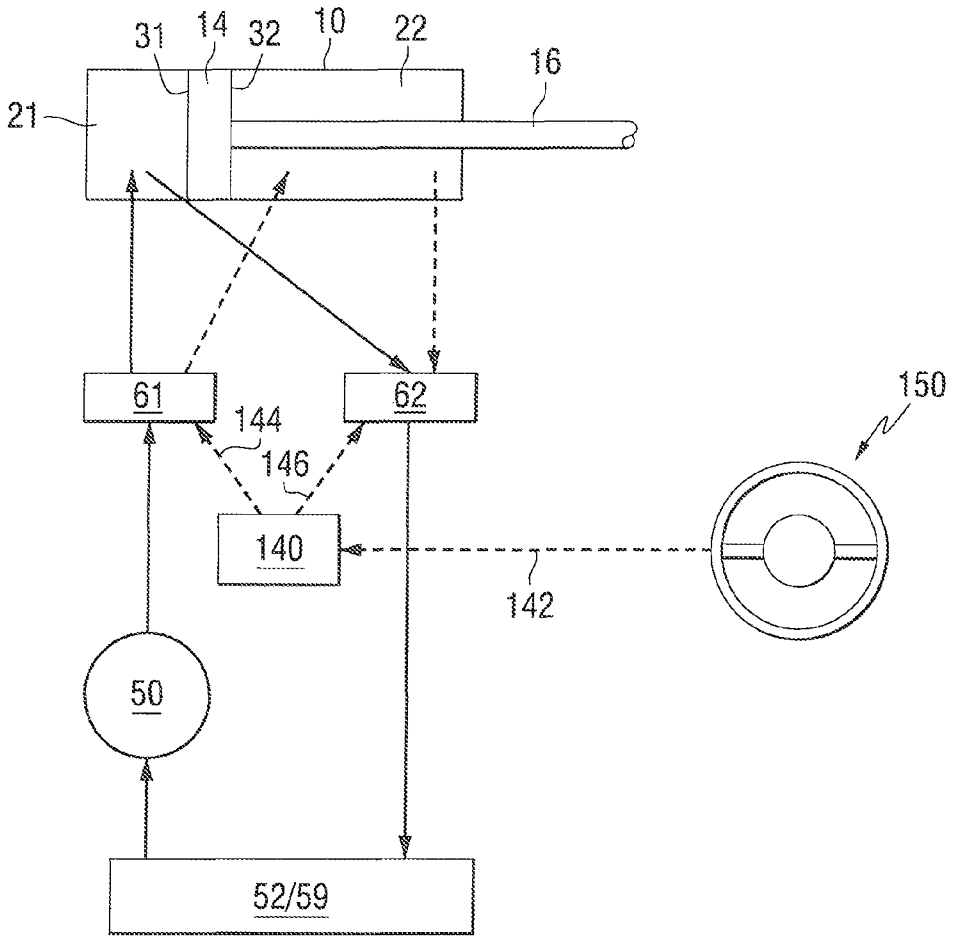
FIG. 4 is a simplified representation of the illustrated of FIG. 1 with the addition of a steering device and a microprocessor.

FIG. 4 is a simplified version of the schematic of FIG. 1 with the addition of a microprocessor and a steering wheel. The cylinder 10 is shown with its piston 14 and piston rod 16. Similarly, the supply valve 61 and the drain valve 62 are shown in simplified form. The pump 50 and reservoir 52/59 are shown in their relative schematic positions as described above in conjunction with FIG. 1. A microprocessor 140 is shown receiving a signal 142 from a steering mechanism 150, such as a steering wheel. The microprocessor receives a signal, such as that represented by line 120 in FIG. 3, from the steering device 150 and determines the appropriate signals, 144 and 146, that are sent to the supply valve 61 and drain valve 62. It is important to note that a single supply valve 61 selectively provides pressurized hydraulic fluid to either the first cavity 21 or the second cavity 22, based on the electrical current provided to its solenoid by the microprocessor 140. The supply valve 61 supplies pressurized hydraulic fluid during both an actuation of the piston 14 toward the right and a retraction of the piston 14 toward the left. The drain valve 62 provides a conduit to meter hydraulic fluid from the hydraulic cylinder 10 during both actuation motions and retraction motions of the piston 14. All supplying of hydraulic fluid to the cylinder 10 is controlled by the supply valve 61 and all draining of the hydraulic fluid from the hydraulic cylinder 10 is controlled by the drain valve 62. Both of these valves are, in turn, controlled by the microprocessor 140 in conformance with the signal 142 that the microprocessor receives from the steering device 150. Oil that is returned to the reservoir 52/59 is recirculated to the pump 50 to be pressurized and conducted selectively to the first or second cavities, 21 or 22, under the direction of the supply valve 61.

With continued reference to FIGS. 1-4, it can be seen that a marine vessel hydraulic steering cylinder control system made in accordance with a preferred embodiment of the present invention comprises a piston 14 disposed within a hydraulic steering cylinder 10 to define a first cavity 21 on a first side of the piston 14 and a second cavity 22 on a second side of the piston. The piston 14 has a first surface 31 facing the first cavity 21 and a second surface 32 facing the second cavity 22. The first surface 31 has a larger area than the second surface 32 because of the attachment of the piston rod 16 to the piston 14 at that surface. A pump 50 is configured to provide a flow of pressurized hydraulic fluid to the hydraulic cylinder 10. A supply valve 61 is connected in fluid communication between the pump 50 and the hydraulic steering cylinder 10. The supply valve is configured to selectively conduct the hydraulic fluid to one of the first and second cavities, 21 and 22, which is selected as a function of a first signal 144 received by the supply valve 61. The supply valve 61 is configured to provide a flow of hydraulic fluid from the pump 50 to the hydraulic steering cylinder 10 and also to determine to which of the first and second cavities, 21 or 22, the flow of hydraulic fluid is directed. The drain valve 62 is connected in fluid communication with the hydraulic steering cylinder 10. The drain valve 62 is configured to selectively conduct the hydraulic fluid from one of the first and second cavities, 21 and 22, which is selected as a function of a second signal 146 received by the drain valve 62. The drain valve is configured to control the rate of flow of hydraulic fluid from the hydraulic steering cylinder and to determine from which of the first and second cavities, 21 and 22, the flow of hydraulic fluid is drained. The supply valve 61 and the drain valve 62 are proportional valves in a preferred embodiment of the present invention. Certain embodiments of the present invention further comprise a microprocessor 140 that is connected in signal communication with the supply valve 61 and the drain valve 62 and configured to provide the first and second signals, 144 and 146, to control the flow of said hydraulic fluid to and from the hydraulic steering cylinder 10. Certain embodiments of the present invention further comprise a steering device 150 which is manually movable to control the movement of a marine vessel. The microprocessor 140 is connected in signal communication 142 with the steering device 150 to receive a steering signal. The microprocessor 140 determines the first and second signals, 144 and 146, as a function of the steering signal 142. The steering device 150 can comprise a steering wheel and a sensor which is configured to provide the steering signal 142 which is representative of the magnitude of rotation of the steering wheel.

Although the present invention has been described in particular detail and illustrated to show a preferred embodiment, it should be understood that alternative embodiments are also within its scope.

We claim:

1. A hydraulic cylinder control system, comprising:

a piston disposed within said hydraulic cylinder to define a first cavity on a first side of said piston and a second cavity on a second side of said piston;

a pump configured to provide a flow of pressurized hydraulic fluid;

a first valve connected in fluid communication between said pump and said hydraulic cylinder, said first valve being configured to selectively conduct said hydraulic fluid to one of said first and second cavities which is selected as a function of a first signal received by said first valve; and a second valve connected in fluid communication with said hydraulic cylinder, said second valve being configured to selectively conduct said hydraulic fluid from one of said first and second cavities which is selected as a function of a second signal received by said second valve.

2. The control system of claim 1, further comprising:

a microprocessor connected in signal communication with said first and second valves and configured to provide said first and second signals to control the flow of said hydraulic fluid to and from said hydraulic cylinder.

3. The control system of claim 1, further comprising:

a steering device which is manually movable to control the movement of a marine vessel, said microprocessor being connected in signal communication with said steering device to receive a steering signal, said microprocessor determining said first and second signals as a function of said steering signal.

4. The control system of claim 3, wherein:

said steering device comprises a steering wheel and a sensor which is configured to provide said steering signal which is representative of the magnitude of rotation of said steering wheel.

5. The control system of claim 1, wherein:

said hydraulic cylinder is a steering cylinder of a marine vessel.

6. The control system of claim 1, wherein:

said first and second valves are proportional valves.

7. The control system of claim 1, wherein:

said second valve is configured to selectively conduct said hydraulic fluid from said one of said first and second cavities to a reservoir for recirculation to said pump.

8. The control system of claim 1, wherein:

said piston has a first surface facing said first cavity and a second surface facing said second cavity, said first surface having a larger area than said second surface.

9. The control system of claim 1, wherein:

said first valve is configured to control the rate of flow of hydraulic fluid from said pump to said hydraulic cylinder and to determine to which of said first and second cavities the flow of hydraulic fluid is directed.

10. The control system of claim 1, wherein:

said second valve is configured to control the rate of flow of hydraulic fluid from said hydraulic cylinder and to determine from which of said first and second cavities the flow of hydraulic fluid is drained.

11. A marine vessel hydraulic steering cylinder control system, comprising:

a piston disposed within said hydraulic steering cylinder to define a first cavity on a first side of said piston and a second cavity on a second side of said piston;

a pump configured to provide a flow of pressurized hydraulic fluid;

a supply valve connected in fluid communication between said pump and said hydraulic steering cylinder, said supply valve being configured to selectively conduct said hydraulic fluid to one of said first and second cavities which is selected as a function of a first signal received by said supply valve, said supply valve being configured to control the rate of flow of hydraulic fluid from said pump to said hydraulic steering cylinder and to determine to which of said first and second cavities the flow of hydraulic fluid is directed; and a drain valve connected in fluid communication with said hydraulic steering cylinder, said drain valve being configured to selectively conduct said hydraulic fluid from one of said first and second cavities which is selected as a function of a second signal received by said drain valve, said drain valve being configured to control the rate of flow of hydraulic fluid from said hydraulic steering cylinder and to determine from which of said first and second cavities the flow of hydraulic fluid is drained.

12. The control system of claim 11, further comprising:

a microprocessor connected in signal communication with said supply valve and said drain valve and configured to provide said first and second signals to control the flow of said hydraulic fluid to and from said hydraulic steering cylinder.

13. The control system of claim 12, further comprising:

a steering device which is manually movable to control the movement of a marine vessel, said microprocessor being connected in signal communication with said steering device to receive a steering signal, said microprocessor determining said first and second signals as a function of said steering signal.

14. The control system of claim 13, wherein:

said steering device comprises a steering wheel and a sensor which is configured to provide said steering signal which is representative of the magnitude of rotation of said steering wheel.

15. The control system of claim 11, wherein:

said supply valve and said drain valve are proportional valves.

16. The control system of claim 11, wherein:

said piston has a first surface facing said first cavity and a second surface facing said second cavity, said first surface having a larger area than said second surface.

17. A marine vessel hydraulic steering cylinder control system, comprising:

a piston disposed within said hydraulic steering cylinder to define a first cavity on a first side of said piston and a second cavity on a second side of said piston, said piston having a first surface facing said first cavity and a second surface facing said second cavity, said first surface having a larger area than said second surface;

a pump configured to provide a flow of pressurized hydraulic fluid;

a supply valve connected in fluid communication between said pump and said hydraulic steering cylinder, said supply valve being configured to selectively conduct said hydraulic fluid to one of said first and second cavities which is selected as a function of a first signal received by said supply valve, said supply valve being configured to control the rate of flow of hydraulic fluid from said pump to said hydraulic steering cylinder and to determine to which of said first and second cavities the flow of hydraulic fluid is directed; and a drain valve connected in fluid communication with said hydraulic steering cylinder, said drain valve being configured to selectively conduct said hydraulic fluid from one of said first and second cavities which is selected as a function of a second signal received by said drain valve, said drain valve being configured to control the rate of flow of hydraulic fluid from said hydraulic steering cylinder and to determine from which of said first and second cavities the flow of hydraulic fluid is drained, said supply valve and said drain valve being proportional valves.

18. The control system of claim 17, further comprising:

a microprocessor connected in signal communication with said supply valve and said drain valve and configured to provide said first and second signals to control the flow of said hydraulic fluid to and from said hydraulic steering cylinder.

19. The control system of claim 18, further comprising:

a steering device which is manually movable to control the movement of a marine vessel, said microprocessor being connected in signal communication with said steering device to receive a steering signal, said microprocessor determining said first and second signals as a function of said steering signal.

20. The control system of claim 19, wherein:

said steering device comprises a steering wheel and a sensor which is configured to provide said steering signal which is representative of the magnitude of rotation of said steering wheel.

* * * * *